(12) United States Patent
Jamil et al.

(10) Patent No.: US 7,792,694 B2
(45) Date of Patent: Sep. 7, 2010

(54) METHOD, SYSTEM, AND STORAGE MEDIUM FOR ASSESSING AND IMPLEMENTING AN ORGANIZATIONAL TRANSFORMATION

(75) Inventors: Mamnoon Jamil, Voorhees, NJ (US);
Daniel J. Peters, Poughquag, NY (US);
Kaan Katircioglu, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 10/905,117

(22) Filed: Dec. 16, 2004

(65) Prior Publication Data
US 2006/0136281 A1    Jun. 22, 2006

(51) Int. Cl.
*G06F 17/30* (2006.01)
(52) U.S. Cl. ............................. 705/10; 707/1; 707/100
(58) Field of Classification Search ........................ None
See application file for complete search history.

(56) References Cited

U.S. PATENT DOCUMENTS

| | | | | |
|---|---|---|---|---|
| 6,101,479 | A * | 8/2000 | Shaw | 705/8 |
| 6,112,188 | A * | 8/2000 | Hartnett | 705/36 R |
| 6,230,314 | B1 | 5/2001 | Sweeney et al. | |
| 6,269,361 | B1 * | 7/2001 | Davis et al. | 1/1 |
| 6,560,647 | B1 | 5/2003 | Hafez et al. | |
| 6,675,149 | B1 | 1/2004 | Ruffin et al. | |
| 6,850,892 | B1 * | 2/2005 | Shaw | 705/8 |
| 6,978,263 | B2 * | 12/2005 | Soulanille | 1/1 |
| 7,035,809 | B2 * | 4/2006 | Miller et al. | 705/8 |
| 7,076,479 | B1 * | 7/2006 | Cheung et al. | 1/1 |
| 7,426,499 | B2 * | 9/2008 | Eder | 706/20 |
| 2001/0034629 | A1 * | 10/2001 | Cronin | 705/7 |
| 2001/0042064 | A1 * | 11/2001 | Davis et al. | 707/3 |
| 2002/0038335 | A1 * | 3/2002 | Dong et al. | 709/203 |
| 2002/0059272 | A1 * | 5/2002 | Porter | 707/100 |

(Continued)

OTHER PUBLICATIONS

Moles, Joseph Bruce (1998) "The development and use of a process identification model to aid in business process reengineering efforts." D.M. dissertation, Colorado Technical University, United States—Florida. Retrieved Sep. 25, 2008, from Dissertations & Theses: Full Text database ProQuest. (Publication No. AAT 9826123).*

(Continued)

*Primary Examiner*—Romain Jeanty
*Assistant Examiner*—Gurkanwaljit Singh
(74) *Attorney, Agent, or Firm*—Cantor Colburn LLP; Wenjie Li

(57) ABSTRACT

A method, system, and storage medium for assessing and implementing an organizational transformation. The method includes identifying at least one process area for each management area targeted for assessment and evaluating at least one solution for the at least one process area. A pairing of a solution to a process area results in a functional area. The method further includes performing orthogonal assessments for each functional area. The orthogonal assessments include determining a need for organizational transformation by ranking each of the functional areas according to a perceived need for organizational transformation, evaluating each of the at least one process area against each of the at least one corresponding solution and calculating any performance gaps identified based upon the evaluating, and evaluating an implementation capability for each of the at least one solution. The method also includes presenting results of each of the orthogonal assessments.

19 Claims, 15 Drawing Sheets

U.S. PATENT DOCUMENTS

| | | | |
|---|---|---|---|
| 2002/0077885 A1* | 6/2002 | Karro et al. | 705/12 |
| 2002/0111817 A1* | 8/2002 | Cronin | 705/1 |
| 2002/0165849 A1* | 11/2002 | Singh et al. | 707/1 |
| 2003/0014379 A1* | 1/2003 | Saias et al. | 706/45 |
| 2003/0030990 A1* | 2/2003 | King et al. | 361/724 |
| 2003/0088458 A1* | 5/2003 | Afeyan et al. | 705/10 |
| 2003/0110067 A1* | 6/2003 | Miller et al. | 705/8 |
| 2004/0006566 A1* | 1/2004 | Taylor et al. | 707/100 |
| 2004/0053246 A1* | 3/2004 | Sorenson | 435/6 |
| 2004/0230586 A1* | 11/2004 | Wolman | 707/100 |
| 2005/0044294 A1* | 2/2005 | Vo et al. | 710/68 |
| 2005/0197875 A1* | 9/2005 | Kauffman | 705/7 |
| 2005/0209945 A1* | 9/2005 | Ballow et al. | 705/35 |
| 2006/0235732 A1* | 10/2006 | Miller et al. | 705/7 |

OTHER PUBLICATIONS

Davenport, Thomas H. "Process Innovation: Reengineering Work Through Information Technology." Harvard Business School Press (1993).*

Davenport, Thomas H. "Putting the Enterprise into the Enterprise System." Harvard Business Review (Jul.-Aug. 1998). pp. 121-131).*

Lecouvie, Kelly Swartz (1999) "Organizational transformation: Managers' experience of business process innovation." Ph.D. dissertation, York University (Canada), Canada. Retrieved Sep. 26, 2008, from Dissertations & Theses: Full Text database ProQuest. (Publication No. AAT NQ43439).*

Martin, James E, & Berthiaume, Ruth D. (1995). Predicting the outcome of a contract ratification vote. Academy of Management Journal, 38(3), 916.*

"Assessing Organizational Change Approaches: Toward a Comparative Typology" Don Hellriegel, John W Slocum. Group & Organization Studies (pre-1986). Mar. 1980. vol. 5, Iss. 1; p. 35 (13 pages).*

Jim Kadlecek, David K Scott, Jay Brooks, & Mick F Jackowski. (1999). Dynamics of planned organizational change: Assessing the use of a theoretical model in intercollegiate athletics. The Mid-Atlantic Journal of Business, 35(2/3), 105-117.*

Robertson, Peter J, Roberts, Darryl R, & Porras, Jerry I. (1993). Dynamics of planned organizational change: Assessing empirical support for a theoretical model. Academy of Management Journal, 36(3), 619.*

"Simulation for Intra- and Inter-Organizational Business Process Modelling", George M. Giaglis and Ray J. Paul, Proceedings of the 1996 Winter Simulation Conference, pp. 1297-1304.

"Business Modeling and Support for Software Product Lines: A Synergetic Approach", Luigi Benedicenti, SEKE'99, Eleventh International Conference on Software Engineering and Knowledge Engineering, pp. 102-105, Jun. 16-19, 1999.

"Integrated Design and Evaluation of Business Processes and Information Systems", George M. Giaglis, Communications of AIS, vol. 2, Article 5, pp. 2-10, Jul. 1999.

"Reconciliation of Business and Systems Modelling via Discrete Event Simulation", George M. Giaglis, Ray J. Paul and Alan Serrano, Proceedings of the 1999 Winter Simulation Conference, pp. 1403-1409.

"Assessment of E-Business Transformation Using Simulation Modeling", Vesna Bosilj-Vuksic et al., Simulation, vol. 78, Issue 12, pp. 731-744, Dec. 2002.

"A Knowledge-Based Risk Assessment Framework for Evaluating Web-Enabled Application Outsourcing Projects", Wendy L. Currie, International Journal of Project Management, vol. 21, No. 3, pp. 207-217, Apr. 2003.

* cited by examiner

| # | MANAGEMENT AREA | ITEM # | DESCRIPTION OF SOLUTION |
|---|---|---|---|
| 1 | | A1 | |
| | | A2 | |
| | | A3 | |
| | | B1 | |
| | | B2 | |
| | | C1 | |
| | | C2 | |
| | | C3 | |
| 2 | | ... | |
| ... | | ... | |
| ... | | ... | |
| q | | T1 | |
| | | T2 | |
| | | U1 | |
| | | U2 | |
| | | U3 | |
| | | U4 | |
| | | V1 | |
| | | V2 | |
| | | V3 | |

FIG. 5

Management area: _____ #: X — 600

| ITEM # | | Revenue Growth | Market share improvement | Cost Reduction | Customer Satisfaction | Inventory Improvement | Productivity Improvement | End-to-end cycle time reduction | Overall Score |
|---|---|---|---|---|---|---|---|---|---|
| | Weights | $W_{X1}$ | $W_{X2}$ | $W_{X3}$ | $W_{X4}$ | $W_{X5}$ | $W_{X6}$ | $W_{X7}$ | $OW_X$ |
| | DESCRIPTION OF SOLUTION | | | | | | | | |
| A1 | | S11 | | | | | | | OOIS(A1) |
| A2 | | | | | | | | | OOIS(A2) |
| A3 | | | | S33 | | | | | OOIS(A3) |
| B1 | | | | | | | | S17 | OOIS(B1) |
| B2 | | | | | | S55 | | | OOIS(B2) |
| C1 | | | | | S74 | | | | OOIS(C1) |
| C2 | | S81 | | | | | | | OOIS(C2) |
| C3 | | | | | | | | S87 | OOIS(C3) |
| | | | | | | | | | |
| | | | | | | | | | |

Column labels: 608 Revenue Growth, 610 Market share improvement, 612 Cost Reduction, 614 Customer Satisfaction, 616 Inventory Improvement, 618 Productivity Improvement, 620 End-to-end cycle time reduction, 622 Overall Score

| Management Area: | | 702 METRIC NAME | 704 CURRENT PERFORMANCE | 706 REQUIRED PERFORMANCE | 708 #: X Process Area: REQUIRED FUNCTIONALITY NAME | 710 CURRENT PERFORMANCE | 712 #: p REQUIRED PERFORMANCE | 714 REQUIRED DATA | 716 CURRENT PERFORMANCE | 718 REQUIRED PERFORMANCE |
|---|---|---|---|---|---|---|---|---|---|---|
| | Weights | $PW_{xm}$ | | | $PW_{xf}$ | | | $PW_{xd}$ | | |
| | DESCRIPTION OF SOLUTION | | | | | | | | | |
| ITEM # | | | | | | | | | | |
| A1 | | $M(A1)_1$ | $MCP(A1)_1$ | $MRP(A1)_1$ | $F(A1)_1$ | $FCP(A1)_1$ | $FRP(A1)_1$ | $D(A1)_1$ | $DCP(A1)_1$ | $DRP(A1)_1$ |
| | | $M(A1)_2$ | $MCP(A1)_2$ | $MRP(A1)_2$ | $F(A1)_2$ | $FCP(A1)_2$ | $FRP(A1)_2$ | $D(A1)_2$ | $DCP(A1)_2$ | $DRP(A1)_2$ |
| | | $M(A1)_3$ | $MCP(A1)_3$ | $MRP(A1)_3$ | | | | $D(A1)_3$ | $DCP(A1)_3$ | $DRP(A1)_3$ |
| | | $M(A1)_4$ | $MCP(A1)_4$ | $MRP(A1)_4$ | | | | | | |
| | Average | — | $AVM(A1)C$ | $AVM(A1)R$ | — | $AVF(A1)C$ | $AVF(A1)R$ | — | $AVD(A1)C$ | $AVD(A1)R$ |
| A2 | | $M(A2)_1$ | $MCP(A2)_1$ | $MRP(A2)_1$ | $F(A2)_1$ | $FCP(A2)_1$ | $FRP(A2)_1$ | $D(A2)_1$ | $DCP(A2)_1$ | $DRP(A2)_1$ |
| | | $M(A2)_2$ | $MCP(A2)_2$ | $MRP(A2)_2$ | $F(A2)_2$ | $FCP(A2)_2$ | $FRP(A2)_2$ | $D(A2)_2$ | $DCP(A2)_2$ | $DRP(A2)_2$ |
| | | | | | $F(A2)_3$ | | $FRP(A2)_3$ | | | |
| | Average | — | $AVM(A2)C$ | $AVM(A2)R$ | — | $AVF(A2)C$ | $AVF(A2)R$ | — | $AVD(A2)C$ | $AVD(A2)R$ |
| A3 | | $M(A3)_1$ | $MCP(A3)_1$ | $MRP(A3)_1$ | $F(A3)_1$ | $FCP(A3)_1$ | $FRP(A3)_1$ | $D(A3)_1$ | $DCP(A3)_1$ | $DRP(A3)_1$ |
| | | $M(A3)_2$ | $MCP(A3)_2$ | $MRP(A3)_2$ | $F(A3)_2$ | $FCP(A3)_2$ | $FRP(A3)_2$ | $D(A3)_2$ | $DCP(A3)_2$ | $DRP(A3)_2$ |
| | | $M(A3)_3$ | $MCP(A3)_3$ | $MRP(A3)_3$ | | | | $D(A3)_3$ | $DCP(A3)_3$ | $DRP(A3)_3$ |
| | | | | | | | | $D(A3)_4$ | | $DRP(A3)_4$ |
| | Average | — | $AVM(A3)C$ | $AVM(A3)R$ | — | $AVF(A3)C$ | $AVF(A3)R$ | — | $AVD(A3)C$ | $AVD(A3)R$ |
| B1 | | $M(B1)_1$ | $MCP(B1)_1$ | | | | | | | |
| C3 | | | | | | | | | | |

Management Area: 720 | 722 #: x  Process Area: 724 | 728 | 730 #: p

| ITEM # | Weights / DESCRIPTION OF SOLUTION | Rules PW$_{xr}$ | Current Performance | Required Performance | Weighted Process Current Performance | Weighted Process Required Performance | Gap |
|---|---|---|---|---|---|---|---|
| | | | | | | | OPW$_{xp}$ |
| A1 | | R(A1)$_1$ | RCP(A1)$_1$ | RRP(A1)$_1$ | | | |
| | | R(A1)$_2$ | RCP(A1)$_2$ | RRP(A1)$_2$ | | | |
| | | R(A1)$_3$ | RCP(A1)$_3$ | RRP(A1)$_3$ | | | |
| | Average | — | AVR(A1)C | AVR(A1)R | PCP(A1)$_p$ | PRP(A1)$_p$ | PG(A1)$_p$ |
| A2 | | R(A2)$_1$ | RCP(A2)$_1$ | RRP(A2)$_1$ | | | |
| | | R(A2)$_2$ | RCP(A2)$_2$ | RRP(A2)$_2$ | | | |
| | Average | — | AVR(A2)C | AVR(A2)R | PCP(A2)$_p$ | PRP(A2)$_p$ | PG(A2)$_p$ |
| A3 | | R(A3)$_1$ | RCP(A3)$_1$ | RRP(A3)$_1$ | | | |
| | | R(A3)$_2$ | RCP(A3)$_2$ | RRP(A3)$_2$ | | | |
| | Average | — | AVR(A3)C | AVR(A3)R | PCP(A3)$_p$ | PRP(A3)$_p$ | PG(A3)$_p$ |
| B1 | | ... | RCP(B1)$_1$ | RRP(B1)$_1$ | | | |
| ... | | | | | | | |
| C3 | | | | | | | |

FIG. 7B

Management Area: _____ #: $\underline{x}$

| | Process 1 Gap | Process 2 Gap | ... | Process p Gap | Weighted Total Gap |
|---|---|---|---|---|---|
| Weights | $TW_{x1}$ | $TW_{x2}$ | ... | $TW_{xp}$ | $TPW_x$ |
| DESCRIPTION OF SOLUTION | | | | | |
| ITEM # | | | | | |
| A1 | $PG(A1)_1$ | $PG(A1)_2$ | ... | $PG(A1)_{ux}$ | $WTG(A1)$ |
| A2 | $PG(A2)_1$ | $PG(A2)_2$ | ... | $PG(A2)_{ux}$ | $WTG(A2)$ |
| A3 | $PG(A3)_1$ | $PG(A3)_2$ | ... | $PG(A3)_{ux}$ | $WTG(A3)$ |
| B1 | $PG(B1)_1$ | $PG(B1)_2$ | ... | $PG(B1)_{ux}$ | $WTG(B1)$ |
| B2 | $PG(B2)_1$ | $PG(B2)_2$ | ... | $PG(B2)_{ux}$ | $WTG(B2)$ |
| C1 | $PG(C1)_1$ | $PG(C1)_2$ | ... | $PG(C1)_{ux}$ | $WTG(C1)$ |
| C2 | $PG(C2)_1$ | $PG(C2)_2$ | ... | $PG(C2)_{ux}$ | $WTG(C2)$ |
| C3 | $PG(C3)_1$ | $PG(C3)_2$ | ... | $PG(C3)_{ux}$ | $WTG(C3)$ |
| | | | | | |
| | | | | | |

*FIG. 8*

Management Area: _____ #: x — 900

| ITEM # | Description of Solution | Readiness (IWx1) | Riskiness (IWx2) | Implementation Complexity (IWx3) | Fit with Organizational Strategy (IWx4) | Cost (IWx5) | Implementation Duration (IWx6) | Overall Implementation Score |
|---|---|---|---|---|---|---|---|---|
| | Weights | IWx1 | IWx2 | IWx3 | IWx4 | IWx5 | IWx6 | OIWx |
| A1 | | IS11 | | | | | IS16 | OIS(A1) |
| A2 | | | | | | | | OIS(A2) |
| A3 | | | | | | | | OIS(A3) |
| B1 | | | | IS43 | | | | OIS(B1) |
| B2 | | | | | IS54 | | | OIS(B2) |
| C1 | | | | | | | | OIS(C1) |
| C2 | | | | | | | | OIS(C2) |
| C3 | | IS81 | | | | | IS86 | OIS(C3) |

902 — Readiness; 904 — Riskiness; 906 — Implementation Complexity; 908 — Fit with Organizational Strategy; 910 — Cost; 912 — Implementation Duration; 914 — Overall Implementation Score Note: Scale of each implementation criteria is different.

- Readiness: 1. Very low  2. Low  3. Medium  4. High  5. Very High
- Riskiness: 1. Very low  2. Low  3. Medium  4. High  5. Very High
- Implementation Complexity: 1. Very high  2. High  3. Medium  4. Low  5. Very low
- Fit with Organizational Strategy: 1. Very poor  2. Poor  3. Satifactory  4. Good  5. Very good
- Cost: 1. Very high  2. High  3. Medium  4. Low  5. Very low
- Implementation Duration: 1. More than 2 years  2. 1-2 years  3. 6-12 months  4. 3-6 months  5. 1-3 months

*FIG. 9*

| ITEM # | Weights DESCRIPTION OF SOLUTION | Impact on Organization EW1 | Process Gap Analysis EW2 | Ease of Implementation EW3 | Overall Evaluation Score OEW |
|---|---|---|---|---|---|
| A1 | | OOIS(A1) | WTG(A1) | OIS(A1) | OES(A1) |
| A2 | | OOIS(A2) | WTG(A2) | OIS(A2) | OES(A2) |
| A3 | | OOIS(A3) | WTG(A3) | OIS(A3) | OES(A3) |
| B1 | | OOIS(B1) | WTG(B1) | OIS(B1) | OES(B1) |
| B2 | | OOIS(B2) | WTG(B2) | OIS(B2) | OES(B2) |
| C1 | | OOIS(C1) | WTG(C1) | OIS(C1) | OES(C1) |
| C2 | | OOIS(C2) | WTG(C2) | OIS(C2) | OES(C2) |
| C3 | | OOIS(C3) | WTG(C3) | OIS(C3) | OES(C3) |

*FIG. 10*

METHOD, SYSTEM, AND STORAGE MEDIUM FOR ASSESSING AND IMPLEMENTING AN ORGANIZATIONAL TRANSFORMATION

BACKGROUND

The invention relates generally to organizational transformation, and more particularly, to a method, system, and storage medium for assessing and implementing an organizational transformation.

Traditional methods of addressing organizational transformation assessments are quantitative and qualitative in nature. The quantitative techniques involve benchmarking and are typically data, resource, and time intensive, often requiring weeks or months to implement. Many larger organizations rely on outsourcing much of the assessment functions to consulting firms to maintain its primary focus on the day-to-day operations. However, the expenses incurred when utilizing outside consultants to facilitate these assessments are often cost prohibitive. Moreover, because the methodologies used by consulting agencies vary from agency to agency, there are no assurances that the assessments will be conducted in a manner that is guaranteed to produce accurate and informative results. Likewise, the organization desiring the assessments may not be sufficiently equipped to effectively perform these assessments.

What is needed, therefore, is a method that enables an organization to make better, more informed and rational decisions to identify the candidates (i.e., functional areas) for organizational transformation and determine an optimal solution. Further, what is needed is a method, along with associated tools and automation that may be used in a workshop setting and may be conducted in a matter of hours or days, depending upon the scope of the assessment.

SUMMARY

Exemplary embodiments relate to a method, system, and storage medium for assessing and implementing an organizational transformation. The method includes identifying at least one process area for each management area targeted for assessment and evaluating at least one solution for the at least one process area. A pairing of a solution to a process area results in a functional area. The method further includes performing orthogonal assessments for each functional area. The orthogonal assessments include determining a need for organizational transformation by ranking each of the functional areas according to a perceived need for organizational transformation, evaluating each of the at least one process area against each of the at least one corresponding solution and calculating any performance gaps identified based upon the evaluating, and evaluating an implementation capability for each of the at least one solution. The method also includes presenting results of each of the orthogonal assessments.

BRIEF DESCRIPTION OF THE DRAWINGS

The foregoing and other objects, aspects, and advantages will be better understood from the following detailed description of exemplary embodiments of the invention with reference to the FIGURES, in which:

FIG. 5 is a template generated via the organizational transformation assessment process system for providing management area information and process area information (including functional areas and corresponding solutions) for an organization in an exemplary embodiment;

FIG. 6 is a template generated via the organizational transformation assessment process system for determining a need for implementing organizational transformation for management/process areas in an exemplary embodiment;

FIGS. 7A-7B are templates generated via the organizational transformation assessment process system for evaluating functional areas against corresponding solutions identified in the template of FIG. 5 in an exemplary embodiment;

FIG. 8 is a template generated via the organizational transformation assessment process system for providing gap analysis for the process templates identified in FIGS. 7A-7B in an exemplary embodiment;

FIG. 9 is a template generated via the organizational transformation assessment process system for assessing the ability to implement each solution into an organization's management area in an exemplary embodiment;

FIG. 10 is a template generated via the organizational transformation assessment process system for providing information regarding impact on organization, process gap analysis, and ease of implementation information in an exemplary embodiment;

DETAILED DESCRIPTION

The organizational transformation assessment process system involves a process for evaluating, comparing, and prioritizing organizational transformation. The organizational transformation assessment process system is an interdisciplinary, proactive process that evaluates one or more functional areas within an organization (e.g., business enterprise, military, government, non-profit organization, educational institution, research institution, etc.). Each functional area, and its proposed solutions for organizational transformation, is assessed utilizing several defined and rank-ordered considerations. The method assesses each functional area's impact on organization, conducts process gap analyses, and compares the ease of implementation of potential solutions.

The organizational transformation assessment process system provides an orthogonal assessment of three key elements: impact on organization, process gap analysis, and ease of implementation of its solutions. The three elements are independent and may be graphically represented for visual comparison of solutions through a scoring methodology for rapid analysis. The organizational transformation assessment process system reveals the justification and the fit of the proposed solutions to the required transformation.

The impact on organization is measured in terms of various criteria. For example, in a business environment, impact may be measured in terms of revenue growth, market share improvement, cost reduction, customer satisfaction, inventory improvement, productivity improvement, and end-to-end cycle time reduction. Process gap analysis is conducted to evaluate any gaps between the current and required processes and it includes collecting information about the various key metrics, data, and rules. Usually, each functional area has more than one potential solution for closing the gap. Each potential solution is evaluated in terms of ease of implementation, which is measured by readiness, riskiness, implementation duration, and complexity, fit with the organization's strategy, and cost.

The organizational transformation assessment process system is sufficiently robust to handle dynamic organizational environments. The method is portable across organizational models and units, including products sold or services provided, if any. The method relates to management, process reengineering, and consultancy fields.

Figure 1:
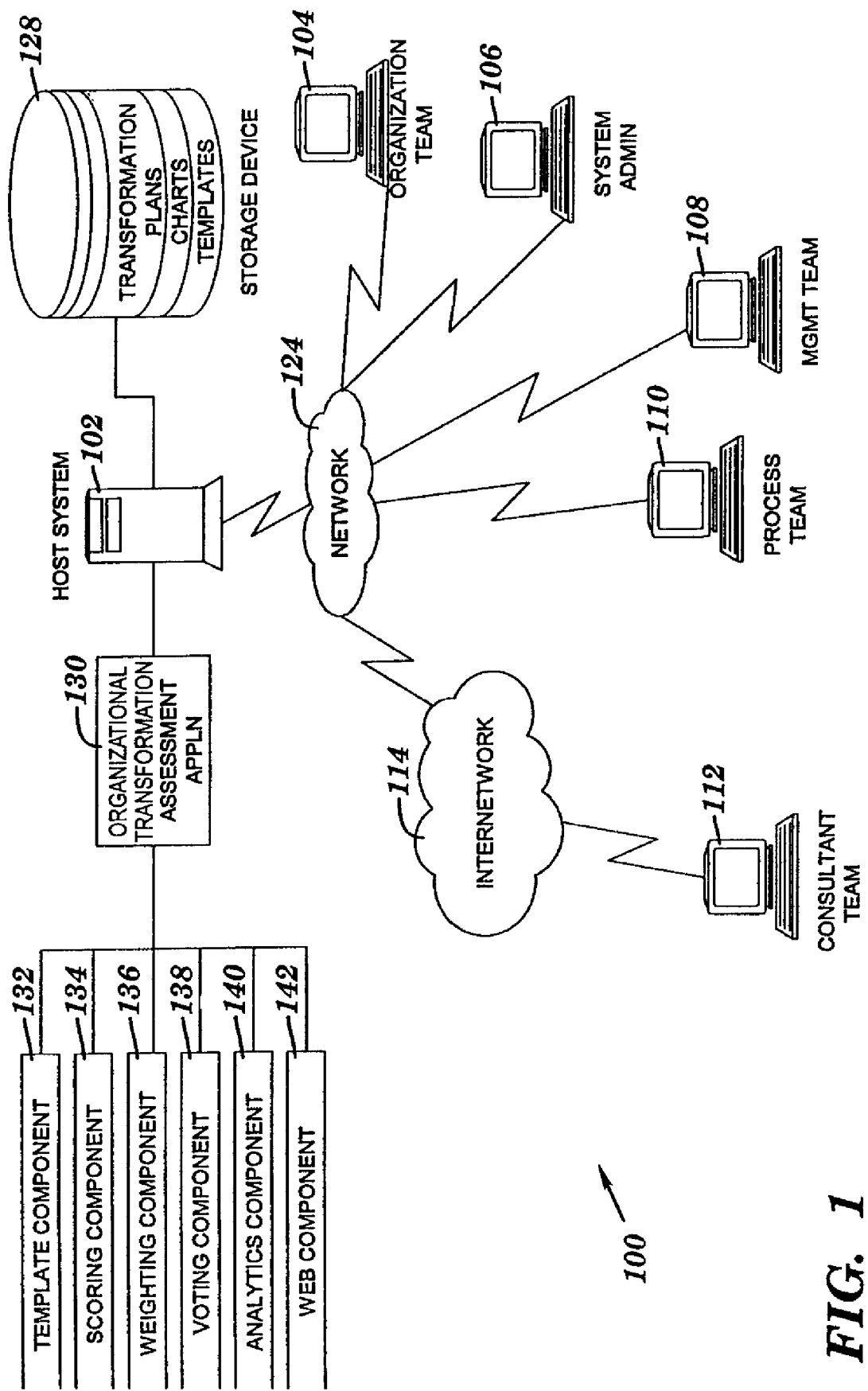
FIG. 1 is a block diagram illustrating the system architecture upon which organizational transformation assessment processes may be implemented in an exemplary embodiment.

Turning now to FIG. 1, an exemplary embodiment of a network system 100 for implementing the organizational transformation assessment process system will now be described. System 100 includes a host system 102 in communication with client systems 104-112 via one or more networks such as networks 124 and 114. The host system 102 depicted in FIG. 1 may be implemented using one or more servers operating in response to a computer program stored in a storage medium accessible by the server. Host system 102 may include a computer system such as an IBM® eServer™ (e.g., iSeries™, pSeries™, etc.) depending upon the scope of the assessments required. The host system 102 may operate as a network server (e.g., a web server) to communicate with the client systems 104-112. Host system 102 handles sending and receiving information to and from client systems 104-112 and can perform associated tasks. Host system 102 executes various applications typically found in an organization.

Host system 102 may also include a firewall to prevent unauthorized access to the host system 102 and enforce any limitations on authorized access. For instance, a system administrator (e.g., client system 106) may have access to the entire system and have authority to modify portions of the system. A firewall may be implemented using conventional hardware and/or software, as is known in the art.

Host system 102 may also operate as an application server. Host system 102 executes one or more computer programs to implement the organizational transformation assessment processes and related functions as described herein. As previously noted, it is understood that separate servers may be utilized to implement the network server functions and the application server functions. Alternatively, the network server, the firewall, and the application server may be implemented by a single server executing computer programs to perform the requisite functions.

Storage device 128 is also included in the system 100 of FIG. 1 and may be implemented using a variety of devices for storing electronic information. It is understood that the storage device 128 may be implemented using memory contained in the host system 102 or it may be a separate physical device. The storage device 128 is logically addressable as a consolidated data source across a distributed environment that includes a network 124 (and if desired, network 114). Information stored in the storage device 128 may be retrieved and manipulated via the host system 102 and, if authorized, members of a consulting team for client system 112. The storage device 128 includes a data repository containing documents, data, web pages, images, multi-media, etc. In particular, storage device 128 stores organizational transformation plans, assessment charts, and completed templates. In an exemplary embodiment, the host system 102 operates as a database server and coordinates access to application data including data stored on storage device 128.

Each of networks 124 and 114 may be any type of known network including, but not limited to, a wide area network (WAN), a local area network (LAN), a global network (e.g., Internet), a virtual private network (VPN), and an intranet. Each of networks 124 and 114 may be implemented using a wireless network or any kind of physical network implementation known in the art. One or more of client systems 104-112 may be coupled to host system 102 through multiple networks (e.g., intranet and Internet) so that not all client systems 104-112 are coupled to host system 102 through the same network. One or more of the client systems 104-112 and the host system 102 may be connected to networks 124 and 114 in a wireless fashion. For purposes of illustration, client systems 104-110 are connected to host system 102 via a wide area network (WAN) 124, and client system 112 is connected to host system 102 via network 124 and internetwork 114 (e.g., Internet).

Client systems 104-112 may comprise general-purpose computer devices that allow systems to connect to one or more networks 124 and 114 and to host system 102. Client systems 104-112 may access the host system 102 via internal web browsers located therein. Individual client systems are described below. It will be understood that additional client systems may be utilized by the organizational transformation assessment process system and that the client systems 104-112 are representative of the types of client systems that may be found in system 100.

Individuals and teams involved in the organization executing the organizational transformation method perform specific roles throughout the organizational processes. They may also be in communication with each other via client systems 104-112.

Organization team client system 104 refers to a computer or workstation operated by senior leadership of the organization. The organization team, or senior leadership, is responsible for the strategic direction and governance of the organization. As described herein, an organization is comprised of one or more management areas, one or more organizational units, or one or more collective organizations. In one embodiment, the organization may be a combination of internal capabilities and external vendors. The organizational assessments may be conducted at the organizational level or organization-unit level, where very large organizations are divided into units for the sake of management and control. In those instances where the unit's management areas are being benchmarked, the unit name would be provided to a benchmarking team. The benchmarking component is described further in FIGS. 12 and 13A-13B.

System administrator client system 106 refers to a computer or workstation operated by individuals or teams that manage the performance, operation, and maintenance of the host system 102, storage device 128, and network 124 identified in the foregoing discussion.

Management team client system 108 refers to a computer device operated by one or more managerial team members. The managerial teams range from first line managers to senior executives or officers, depending upon the scope of the assessment. In accordance with exemplary embodiments, the management team supervises a specified management area that the organization team has selected for assessment. For example, in a business environment, some examples of a management area may include marketing, procurement, finance, manufacturing, channel management, etc. Additionally, when using the voting component 138 of the organizational transformation assessment process system, higher levels of management may have increased voting authority assigned for scoring and weighting activities based upon their position within the management team. Management areas are described further in the diagram 200 of FIG. 2.

Process team client system 110 refers to a computer device operated by one or more process team members under a specified management team. In exemplary embodiments, the process team includes subject matter experts versant in all aspects of a process, including applications, data, metrics, organization rules, and required functionality. For example, in a business context, some examples of process areas may include scheduling, customer fulfillment, integrated marketing communications, inventory control, intra-company accounting, reverse logistics, etc. Process areas are described further in the diagram 300 of FIG. 3.

Consultant team client system 112 refers to a computer or workstation operated by one or more consultants supporting the organization team in the conduct of the organizational transformation assessment process. These consultants may be internal or external, and may be expert practitioners in the art of conducting organizational transformation assessments. Consultants may be employed to expedite the organizational transformation assessment process or, alternatively, when the organization team deems the breadth and depth of the organizational assessment are sufficient for additional technical and facilitation assistance.

Organizational transformation assessment application 130 refers to a computer program that implements the organizational transformation assessment process system described herein. The organizational transformation assessment application 130 includes components 132-142, which are described below.

Template component 132 contains standardized templates, which include the names of the management areas, process areas, scores, weights, and other pertinent data used in conducting the assessments. The standardized templates are completed via other components (e.g., one or more of components 134-142) from separate client systems (e.g., 104-112) as described herein. In exemplary embodiments, the scores and weights are indicated as positive integers, with scores ranging from 1 to 5 in whole number increments with associated legends. All calculations (averages and totals) are carried to one decimal place throughout the templates and will range from 1.0 to 5.0 in one tenth increments.

Scoring component 134 permits the management and process teams to score the templates. The scoring is based on a scale of 1 to 5 in whole number increments, with each scoring methodology having its unique legend based on the particular template being completed. In highly interactive sessions, the scoring may be determined by secret voting (weighted or unweighted) using the voting component 138 via one or more client systems as described herein.

Weighting component 136 permits the management and process teams to weight information provided in the templates within the template and voting components, 132 and 138 respectively. The weights are assigned by relative magnitude to each other, and need not equal 100. Weights are assigned to each of the templates, are positive integers, and permit the allocation of emphasis throughout the assessment. In exemplary embodiments, the default weight is the number one (1), and this default weight may be used for all unweighted assessments. Weights should not be zero or negative as either situation would invalidate the results of the assessment. The total weight calculations are the divisor in the template calculations, providing a normalizing factor across the template when calculating the overall scoring totals. In highly interactive sessions, the weighting may be determined by secret voting (weighted or unweighted) using the voting component 138 from one or more client systems as described herein. The organization team 104 may adjust the weighting schema in the weighting component 136 to conduct sensitivity analyses and visualize the results within the analytics component 140.

Voting component 138 permits the management and process teams to vote on the scoring and weighting functions applied to the templates. In highly interactive sessions, the scoring and weighting may be determined by secret balloting (weighted or unweighted) using the voting component 138 from one or more client systems as described herein. In workshop sessions, consensus-building techniques may be used to determine weighting and scoring.

Analytics component 140 produces the assessment reports and provides graphical representation based on the completed templates. The assessment reports may be weighted and unweighted (default weight is "1") for evaluating the role and degree of bias played within the assessment.

Web component 142 permits the use of web technology and applications to streamline and expedite the interactions between the various teams and to automate the processes provided by the organizational transformation assessment process system. For the assessments, the organization and/or benchmarking teams may determine if the Web component 142 will be used in the conduct of virtual assessments or whether a manual workshop setting is preferred for either assessment. In some cases, the workshop may be conducted over the Web using Web conferencing tools such as IBM's SameTime™ e-meeting technology.

Figure 2:
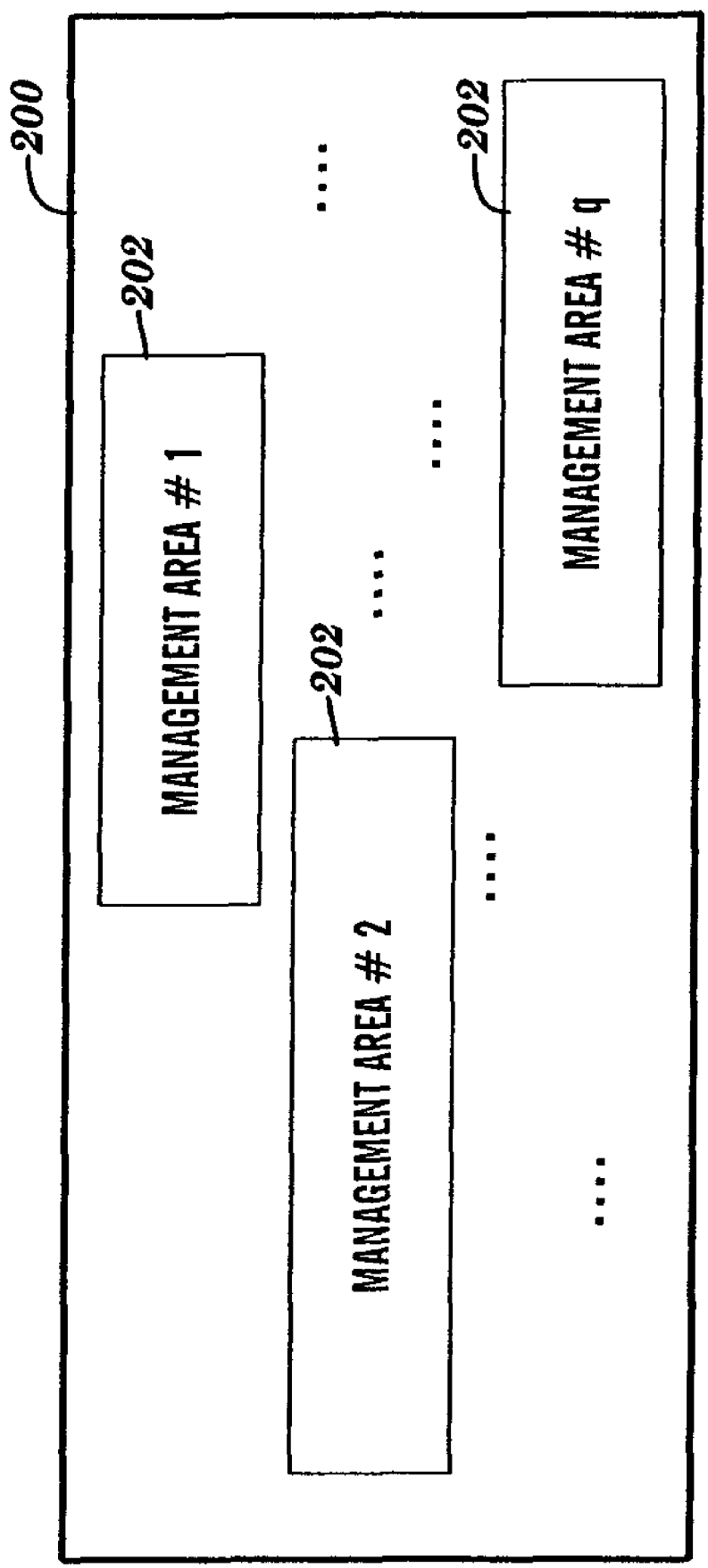
FIG. 2 is a block diagram illustrating an organization architecture overview in an exemplary embodiment.

For purposes of illustration, the organizational transformation process will be described with respect to a business enterprise. However, it will be understood by those skilled in the art that other types of organizations, such as non-profit organizations, may implement organizational transformations by modifying one or more of the templates. Turning now to FIG. 2, a diagram depicting a sample organization architecture 200 that is serviced by the organizational transformation process system will now be described. In accordance with exemplary embodiments, the organization is comprised of one or more management areas 202. As described above, management areas refer to divisions of the organization and are classified for purposes of organizational administration as well as for purposes of assessment (e.g., marketing, procurement, finance, manufacturing, channel management, etc). The organization team selects the number of management areas 202 to be assessed, in this case a number represented by "q". The number "q" may be less than or equal to the number of management areas 202 within the organization. In some cases, not all management areas 202 will be assessed without having a negative effect on the overall assessment. For some assessments, only one management area 202 may be selected. The focus of the organizational transformation effort dictates the scope of the assessment selected by the organization team.

Figure 3:
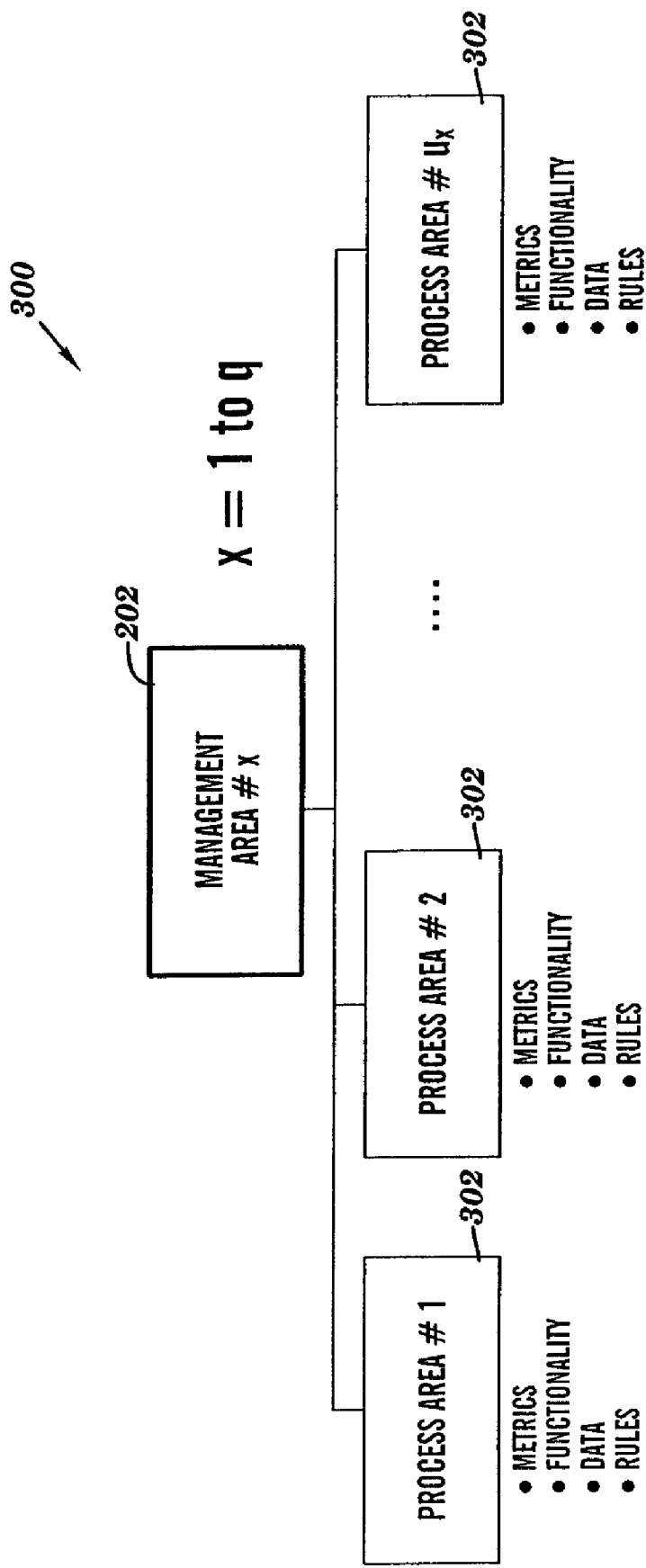
FIG. 3 is a block diagram illustrating a management area architecture overview in an exemplary embodiment.

As indicated above, each management area 202 comprises one or more process areas. A diagram depicting a sample management area architecture 300 will now be described with reference to FIG. 3. Management area 202 includes process areas 302. A process area refers to an activity or function that is performed by, or associated with, a particular management area. In a business context, for example, process areas may include scheduling, customer fulfillment, integrated marketing communications, inventory control, intra-company accounting, reverse logistics, manufacturing planning, distribution planning, supply and demand planning, pricing, revenue management, customer support, etc. Examples of process areas relating to a non-profit organization may include fund raising, constituent services, and public relations, to name a few. In a government or military context, examples of process areas may include budgeting, planning, training, equipping, embarking, deploying, administration, communications, engineering, operations, security, safety, etc. As shown in FIG. 3, management areas are denoted by a variable "x", which ranges from 1 to "q". The management team selects the process areas 302 (denoted by a variable "p") for evaluation. The process areas, 'p', 302 range in number from 1 to "$u_x$", where "$u_x$" denotes the total number of process areas for management area x. In exemplary embodiments, all process areas under each management area being assessed are included in the implementation of the organizational transformation assessment process system. Any process area exclusion may have profound effects on the ultimate course of action selected by the organization team as well as an overall negative effect on organizational transformation. A process area may be defined as a discrete element of a management area, which is conducted sequentially or in parallel with other process areas within that management area. The process area's functional areas and potential solutions are assessed on four categories: metrics, required functionality, data, and rules. Metrics refers to the measurement of a process or activity. Required functionality refers to the designed use of a process or activity that creates value. Data refers to information that is historical, referential, statistical, or derived by calculation, in electronic or written form, and organized for analysis or used as the basis for a decision. A rule refers to a regulation governing a process or activity. This may be a mathematical calculation, written instruction, or logical expression for providing control, order, or direction.

The organizational transformation assessment process system contemplates three ways in which the organizational transformation assessment application 130 may be deployed. The first option is an organizational process (with or without consultants), and is described with reference to the flow diagram 400 of FIG. 4. The second option is a benchmarking process that is used in conjunction with a third party providing confidential and proprietary data from external users (e.g., client system 122). The benchmarking assessment process is described with reference to the system diagram 1200 of FIG. 12 and corresponding flow diagram 1300A-B of FIGS. 13A-13B. In the third option, both processes (the flow diagrams 400 of FIG. 4 and 1300 of FIGS. 13A-13B) are conducted in parallel with each other. This latter option may be exercised when the benchmarking process by itself does not evaluate certain management areas or solutions. Regardless of the assessment process employed, each of the options uses the same templates. The defining differences between the organizational process and benchmarking process are which parties complete the templates and to what degree each of the various teams (e.g., 104-112, 118-122) completes the templates.

The method described in the flow diagram 400 of FIG. 4 refers to implementation of the organizational transformation assessment process system using the organizational option as will now be described. The method begins at step 401 whereby it is determined whether to conduct an organizational transformation assessment at step 402. If not, the method ends at step 403. Otherwise, the method continues at step 404, whereby the organization team initiates the organizational transformation assessment application 130 and the Organization template 500 of FIG. 5 is displayed.

As indicated above, the organizational transformation assessment process system may be implemented with the outside assistance of a consulting group. At step 405, it is determined by the organization team whether consultants should be brought in. If so, a consulting group is selected and brought in to the process at step 406. The consulting team may assist in the assessment process via access to one or more components 132-140 via web component 142 and network 124.

At step 408, the organization team, in consultation with selected management team(s) (and optionally the consulting team), identifies one or more management areas to be assessed. In a business context, for example, examples of management areas may include marketing, supply chain, human resources, distribution, transitional activities or turnover points between two or more management areas, etc. In the government sector, examples of traditional management areas include public safety, emergency management, agriculture, labor, defense, commerce, health services, diplomatic service, criminal justice, treasury, etc. The identifying number of the management area (e.g., 1-q) is entered in column 502 of Organization template 500 and a description of the management area (e.g., human resources) is entered into column 504 of Organization template 500. As described above, this process may be facilitated in a collaborative manner via one or both of client systems 104 and 112 (via web component 142).

At step 410, the management team associated with the management area 202 identified, in consultation with selected process teams, identify process areas 302 (e.g., scheduling, customer fulfillment, integrated marketing communications, inventory control, intra-company accounting, reverse logistics, manufacturing planning, distribution planning, supply and demand planning, pricing, revenue management, customer support etc.) and functional areas to be assessed. Possible solutions for each identified process area are identified as well. This information is entered into columns 506-508 of Organization template 500 at step 412. Process areas are denoted as alphabetical characters (e.g., A, B, C, etc.) and solutions are designated as numeric characters (e.g., 1, 2, 3, etc.). The number of rows in Organization template 500 may be expressed as (rows i=1 to n, whereby n=Sum of $n_x$, x=1 to q, q=number of management areas, $n_x$=number of solutions for management area x, and n=total number of solutions for the organization).

As indicated above, there may be multiple process areas associated with each management area. Further, there may be multiple possible solutions for each process area. Process areas are broken down into functional areas in order to pair up multiple solutions to each process area. For example, if process area A is associated with three possible solutions, then the pairing of the first solution to the process area A is referred to as a first functional area. A second solution paired with the process area A is then referred to as a second functional area, and so forth. The identifying character of each process area is entered by the respective management area team in column 506 of Organization template 500 of FIG. 5. The completed Organization template 500 may be stored in storage device 128 via template component 132 of FIG. 1.

It will be appreciated that in some organizational transformation assessments, a single process area may be identified for two or more management areas. However, the solutions supporting the process area may be the same or different. For instance, for a process area "Planning", one solution may be used for three different management areas (interdisciplinary), whereas another "Planning" solution may be applicable to only one management area. In the interdisciplinary "Planning" scenario, the assessment may identify the impact on three management areas for this single solution. With each management area potentially being weighted differently, the organizational impact, gap analysis, and ease of implementation may vary, and provide insightful reflection for solutions. Therefore, the organizational transformation assessment process system is sufficiently robust to handle all of these variations and assess their impact on organization.

Once the Organization template 500 of FIG. 5 has been completed, the management teams for each management area being assessed access and complete an Impact on Organization template 600 from template component 132 of FIG. 1 at step 414. A user interface screen depicting a sample Impact on Organization template 600 is shown in FIG. 6. In accordance with exemplary embodiments, the information provided in Organization template 500 of FIG. 5 is automatically transferred to the applicable sections of the Impact on Organization template 600. The Impact on Organization template 600 facilitates a determination of the need for organization transformation at the functional area level.

The management team assigns weights to seven facets identified as being relevant to the organization. For illustrative purposes, these facets are directed to a business environment as shown in the Template 600 and are identified in columns 608-620 of Template 600 as: revenue growth (column 608), market share improvement (column 610), cost reduction (column 612), customer satisfaction (column 614), inventory improvement (column 616), productivity improvement (column 618), and end-to-end cycle time reduction (column 620). These items are then transferred to the weighting component 136 of FIG. 1 as directed. Template 600 columns may be expressed as columns j=1 to 7, with impact weights $W_{xj}$. Impact weights $W_{xj}$ are assigned to each business facet with relative magnitude to one another and may be different for each management area 'x', with x ranging from 1 to q. The default weight is '1' for unweighted assessments.

The management team provides weights to these facets by specifying a score ranging from 1 to 5, whereby 1 denotes a very low score, 2 denotes a low score, 3 denotes a medium score, 4 denotes a high score, and 5 denotes a very high score. The greater the impact of a facet on the management area, the higher the weighting score will be. Scores ranging from 3 to 5 indicate a strong need for organizational transformation. The scores may be expressed as $S_{ij}$, whereby i=1 to $n_x$, and j=1 to 7. The weighting component 136 of FIG. 1 provides logic for processing the weighted items in Template 600, resulting in an overall score for each functional area (i.e., line item) in column 622. The overall weight may be expressed as $OW_x$=Sum of $W_{xj}$, whereby x=1 to q, and j=1 to 7. The overall organizational impact score (OOIS) for each line item may then be expressed as OOIS(functional area identifier)=[Sum of $S_{ij}*W_{xj}$(row i=1 to $n_x$)(j=1 to 7)]/$OW_x$, whereby x=1 to q.

In exemplary embodiments, each functional area is rated equally, as the assessment performed is agnostic of any proposed solutions. This Template 600 anchors the assessment process by providing an initial ranking for organizational transformation. If the management team is unable to agree upon one or more rankings, the organizational transformation assessment process system provides a voting component 138 of FIG. 1, which enables members of the management team to vote on the weights as needed. The voting component 138 of FIG. 1 may be accessible to each member of the management team via one or more management team client systems (e.g., 108) whereby each member enters his/her vote on a proposed weight, and the voting component 138 performs logic on the entered data (e.g., averaging the weights entered), resulting in a final score from 1 to 5 for the line item. An Impact on Organization template 600 is completed for each management area targeted for assessment. Once completed, the method described in the flow diagram 400 of FIG. 4 proceeds to step 416.

At step 416, process teams associated with the process areas to be assessed access a Process template 700A-B from template component 132 of FIG. 1, a sample of which is shown in FIGS. 7A and 7B. The Process template 700A-B enables a process team to evaluate the process areas identified above against their respective solutions in light of four dimensions: metrics, required functionality, data, and rules. The strengths and weaknesses of each process area and solution (i.e., functional area) are evaluated on the basis of current and required process performance (in columns 704, 706 for metric; columns 710, 712 for required functionality; columns 716, 178 for data; and columns 722, 724 for rules, respectively), and any performance gaps are calculated at the functional area level (i.e., line item level). In exemplary embodiments, this detailed decomposition is conducted by subject matter experts in the field of the process area being assessed. When consensus opinion cannot be rendered, the process team members may access the voting component 138 of FIG. 1 in a manner similar to that described above with respect to the Impact on Organization template 600 of FIG. 6.

Upon accessing the Process template 700A-B of FIGS. 7A-B, the organizational transformation assessment application 130 automatically transfers the applicable data from the Organization template 500 of FIG. 5 to the Process template 700A-B. The members of the process team assign process weights, expressed as ($PW_{x\_}$), to the management area x, with the blank (or underscore) denoted by one of four categories: metric 'M', required functionality 'F', data 'D', or organization rules 'R' for each process area. The weighting component 136 of FIG. 1 performs logic on the weights entered by the process team that results in an overall process weight ($OPW_{xp}$) for management area 'x' and process area 'p'. The overall process weight may be expressed as $OPW_{xp}=PW_{xm}+PW_{xf}+PW_{xd}+PW_{xr}$. The process team members assign specific names for the metric, required functionality, data, and organization rules for each functional area and solution (in columns 702, 708, 714, and 720, respectively), which may be expressed as (_(functional area)_), whereby the first blank is denoted by one of 'M' for metric, 'F' for required functionality, 'D' for data, and 'R' for organization rules, and the second blank denotes the number of names for each functional area and solutions (1 to z). The number 'z' represents for each metric, required functionality, data and rule the highest number of names within each functional area and solution, and is used as the divisor when calculating the average scores. For example, in Template 700A of FIG. 7, z=4 for A1 metrics, z=2 for A3 required functionality, and z=3 for A1 required data. The score is averaged for each category (i.e., metric, required functionality, data, and organization rules) based on the number of names for each functional area used.

The process team members then assign a current performance scoring and a required performance scoring, which may be expressed as (_CP(functional area)_) and (_RP(functional area)_), respectively, for each functional area utilizing a scoring system of 1-5. The analytic component 140 calculates the average scores for both the current performance and required performance items, expressed as (AV_(functional area)_C)=[Sum of _CP(functional area)_]/z, whereby the first blank is denoted by one of 'M' for metrics, 'F' for required functionality, 'D' for data, and 'R' for rules, and the second blank is from 1 to z, with z being the highest number of names within each functional area and solution. Additionally, (AV_(functional area)_R)=[Sum of _CP(functional area)_]/z, whereby the first blank is denoted by one of 'M' for metrics, 'F' for required functionality, 'D' for data, and 'R' for rules, and the second blank is from 1 to z, with z being the highest number of names within each functional area and solution. The results of these calculations are provided in rows 732 of template 700.

The analytic component 140 further calculates the weighted process current performance (presented in column 726) and weighted process required performance for each functional area (presented in column 728). The weighted process current performance may be expressed as (PCP(functional area)$_p$) and as applied to all line items shown in row 732 for functional area A1 may be expressed as PCP(A1)$_p$= [{PW$_m$*AVM(A1)C}+{PW$_f$*AVF(A1)C}+{PW$_d$*AVD(A1)C}+{PW$_r$*AVR(A1)C}]/OPW$_p$. The weighted process required performance may be expressed as (PRP(functional area)$_p$) and as applied to all line items shown in row 732 for functional area A3 may be expressed as PRP(A3)$_p$= [{PW$_m$*AVM(A3)R}+{PW$_f$*AVF(A3)R}+{PW$_d$*AVD(A3)R}+{PW$_r$*AVR(A3)R}]/OPW$_p$. Utilizing the weighted process current performance data and the weighted process required performance data, the analytic component 140 calculates any gap in performance for each functional area. The process gap may be expressed as (PG(functional area)$_p$)= PRP(functional area)$_p$–PCP(functional area)$_p$ and is presented in column 730.

One Process template 700A-B for each management area is completed by the process team. Once all management areas have been covered by the Process template, the process team(s) then access the Management Area template 800 from the template component 132 of FIG. 1, a sample of which is shown in Template 800 of FIG. 8. At step 418, the process team(s) complete the Management Area template 800. The Management Area template 800 enables the process teams to 'roll up' the data in each of the completed Process templates 700A-B of FIGS. 7A-B, providing gap analysis at the management area level for the assessment process and ensuring that all of the functional areas and corresponding solutions are included in the management area gap determination. Upon accessing the Management Area template 800, the organizational transformation assessment application 130 automatically transfers the applicable data from the Organization template 500 of FIG. 5 to the Management Area template 800. The process team assigns total weights (expressed as TW$_{xp}$) to each process area, whereby x is the number of management areas and 'p' is the number of process areas.

If the process team members cannot reach a consensus in determining the total weights, the voting component 138 may be utilized as described above. The analytics component 140 calculates a total process weight (expressed as TPW$_x$) for each management area. The process gap scores, or (PG(functional area)$_p$), are transferred from the Process template 700A-B of FIG. 7 to the Management Area template 800, and the analytics component 140 calculates the weighted total gap in performance (expressed as WTG(functional area). Using the sample data for functional area A3 shown in Management Area template 800, the weighted total gap in performance may be expressed as WTG(A3)=[sum of {TW$_{xp}$*PG(A3)$_p$}, p=1 to u$_x$]/TPW$_x$, x=1 to q. Column 730 data from Template 700 of FIG. 7 is transferred to the respective columns 802 through 806 in Template 800 of FIG. 8. This Template 800 is completed for each management area to be assessed. Upon completion, the Management Area template 800 is submitted to the respective management team at step 420.

At step 422, the management teams access an Ease of Implementation template 900, a sample of which is shown in FIG. 9. The Ease of Implementation template 900 enables management teams to assess the ability of the organization to implement each identified solution into the organization's management area. The ease of implementation criteria include: readiness of the organization to perform the transformation (column 902), the riskiness of change (column 904), the complexity of the implementation (column 906), the fit with the organization strategy (column 908), the resource cost of implementation (e.g., human, monetary, and material) (column 910), and implementation duration (column 912). The scoring for each of these criteria varies from the previously described templates, and should be carefully assessed. This scoring is shown in FIG. 9. The complexity and cost criteria are juxtaposed against the readiness, risk and strategy criteria. These differences may be viewed as 'pro' and 'con' relationships between the two groups of criteria, ensuring a comprehensive assessment as to the ease of implementation. The implementation duration criteria specifies time horizons, with scores of 1 and 2 focused on the strategic transformation, and scores 3 through 5 targeting tactical transformation.

The management team completes the Ease of Implementation template 900 from template component 132 of FIG. 1. The organizational transformation assessment application 130 automatically transfers applicable data from previously completed templates to the Ease of Implementation template 900. The management team assigns relative impact weights (expressed as IW$_{xk}$) to six ease of implementation facets, whereby x=1 to q, and k=1 to 6. If consensus among the management team cannot be reached, the voting component 138 of FIG. 1 may be utilized as described above. Once completed, the analytics component 140 of FIG. 1 calculates the overall impact weight for each functional area (column 914), which may be expressed as (OIW$_x$)=Sum of IW$_{xk}$, whereby k=1 to 6, and x=1 to q. The team members then conduct a scoring methodology (expressed as IS$_{ik}$), whereby i=1 to n$_x$, x=1 to q, and k=1 to 6, on a scale ranging from 1 to 5. Again, the voting component 138 of FIG. 1 may be utilized to assist in any conflicts of opinion. An overall impact score (OIS) is calculated via the analytics component 140 of FIG. 1 and may be expressed as OIS(functional area) for row i (i=1 to n)=OIS(functional area)=[Sum of IS$_{ik}$*IW$_{xk}$ (k=1 to 6)]/OIW$_x$. Once the Ease of Implementation template 900 has been completed for each management area, the method continues at step 424 in which the management team completes an Overall Evaluation template 1000, a sample of which is shown in FIG. 10.

The Overall Evaluation template 1000 of FIG. 10 provides a summarized view of the results of the previously completed templates 500-900. Upon accessing the Overall Evaluation template 1000 from template component 132 of FIG. 1, the organizational transformation assessment application 130 automatically transfers applicable data from the previously completed templates 500-900 to the Overall Evaluation template 1000. The management area team members assign relative evaluation weights (expressed as EW$_v$) to three facets, whereby v=1 to 3. The three facets are: impact on organization, process gap analysis, and ease of implementation. If consensus cannot be reached by the management team members, the voting component 138 of FIG. 1 may be utilized. Once the relative evaluation weights have been entered, the analytics component 140 of FIG. 1 calculates an overall evaluation weight (expressed as OEW=EW$_1$+EW$_2$+EW$_3$). The organizational transformation assessment application 130 transfers the impact on organization, process gap analysis and ease of implementation scores from Templates 600, 700A-B, and 900 to the Overall Evaluation template 1000. The analytics component 140 calculates an overall evaluation score (OES) expressed as OES(functional area)=[{OOIS (functional area)*$EW_1$}+{WTG(functional area)*$EW_2$}+ {OIS(functional area)*$EW_3$}]/OEW. Upon completion of Template 1000, the resulting data relating to the three facets may be translated into graphical form, a sample of which is shown in the chart 1100 of FIG. 11.

Figure 11:
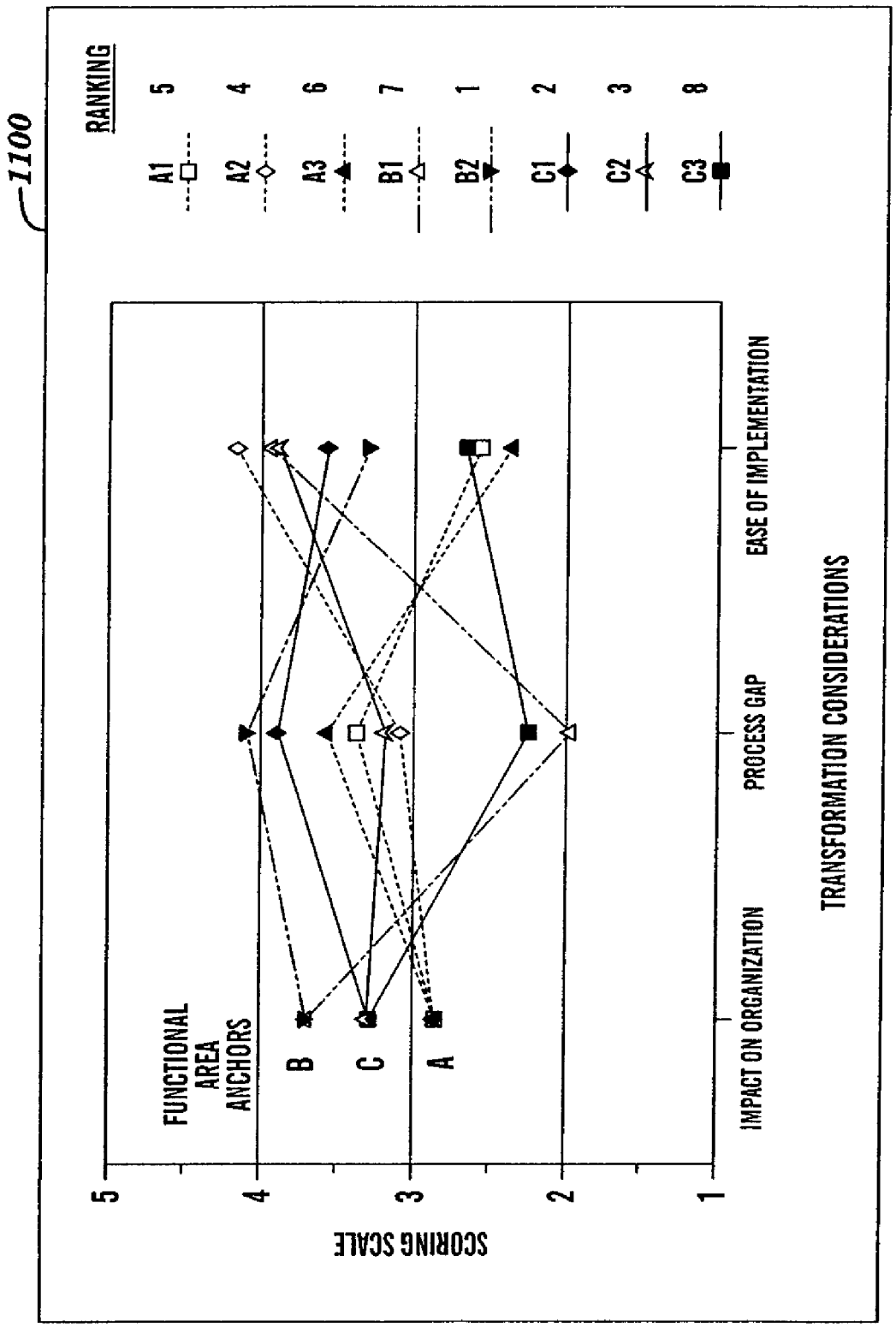
FIG. 11 is a graphical representation of a sample completed organizational transformation assessment generated via the organizational transformation assessment process system in an exemplary embodiment.

For illustrative purposes, the following analysis is provided with respect to chart 1100 of FIG. 11. The management area is shown as "1" based upon the functional areas provided. The functional area anchors are ranked from high to low (B, C, and A). Since functional areas "B" and "C" are rated above 3 (medium), these functional areas would be deemed ripe for organizational transformation. Functional area "A" warrants monitoring since it is below 3, and remaining organizational transformation resources may be applied to this functional area as they become available.

Solution "B2" would be deemed to the preferred solution for functional area "B" since it rated high in closing the process gap and has moderate ease of implementation. Solution "B1" was rated low in closing the process gap with a high ease of implementation.

Solutions "C1" and "C2" are rated closely, with solution "C1" providing the greatest process benefit. Both solutions provide moderate to high ease of implementation. Solution "C3" has low process gap closure and ease of implementation and, thus, should not be considered.

If resources permit, solution "A2" should be adopted over solutions "A1" and "A3". All three solutions moderately close the process gap, with solution "A2" having a very high ease of implementation compared to low ease of implementation for solutions "A1" and "A3".

The above represents a typical analysis for management area "1". However, if solutions are interdisciplinary (e.g., cross management area boundaries), this analysis may need to be reassessed in light of other favorable considerations identified in the organizational transformation assessment.

Utilizing the data provided in chart 1100, the management teams conduct analysis of assessment results based upon the Overall Evaluation template 1000 of FIG. 10 and solutions assessment at step 426. Several possible courses of action may then be recommended by the management teams at step 428. Armed with this information, a course of action is selected at step 430 and implemented as an organizational transformation at step 432.

Figure 4:
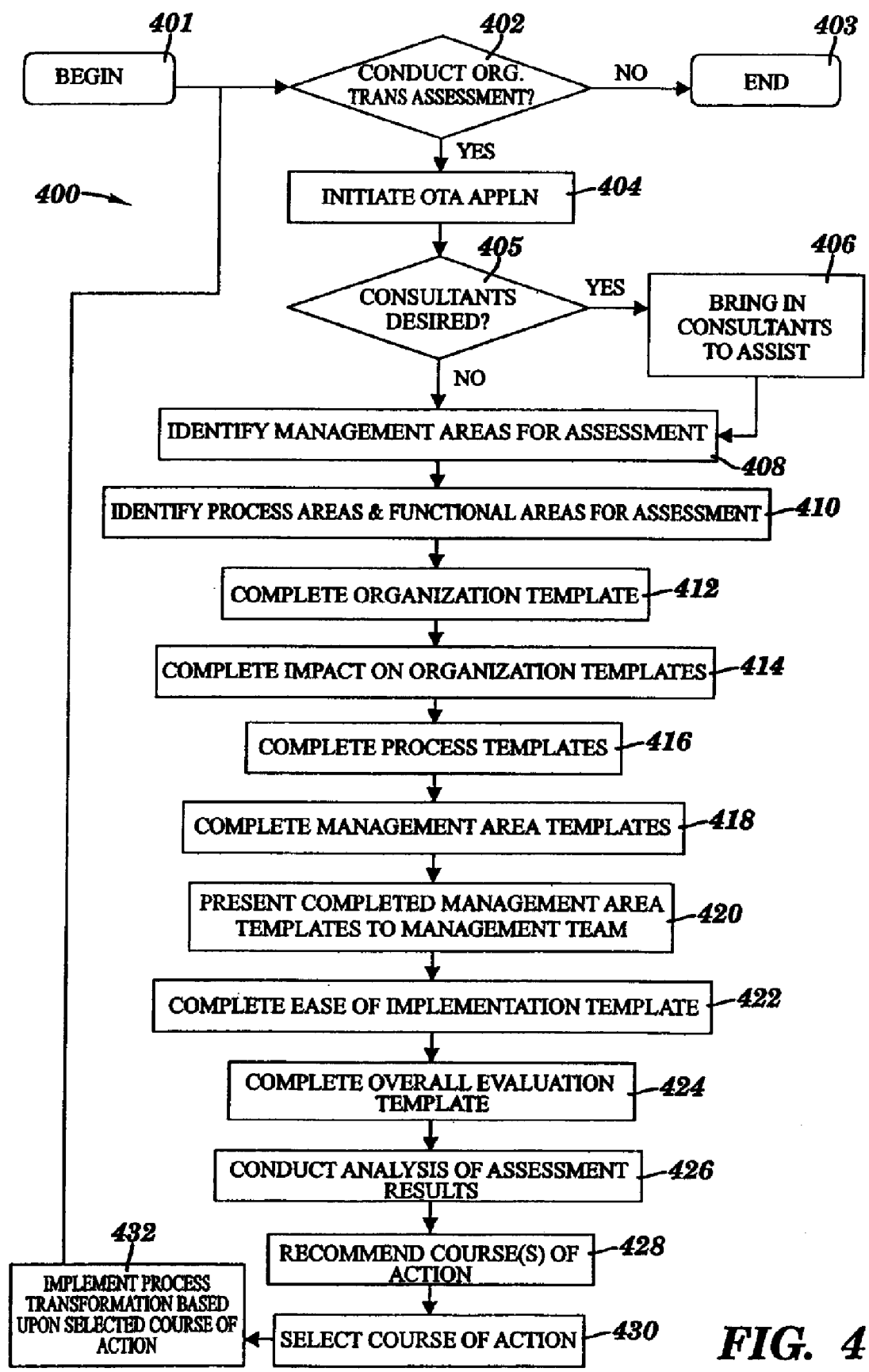
FIG. 4 is a flow diagram describing the organizational assessment process in an exemplary embodiment.

As required, the method as described above may be repeated for each organizational transformation assessment desired by the organization by returning to step 401 of FIG. 4.

Figure 12:
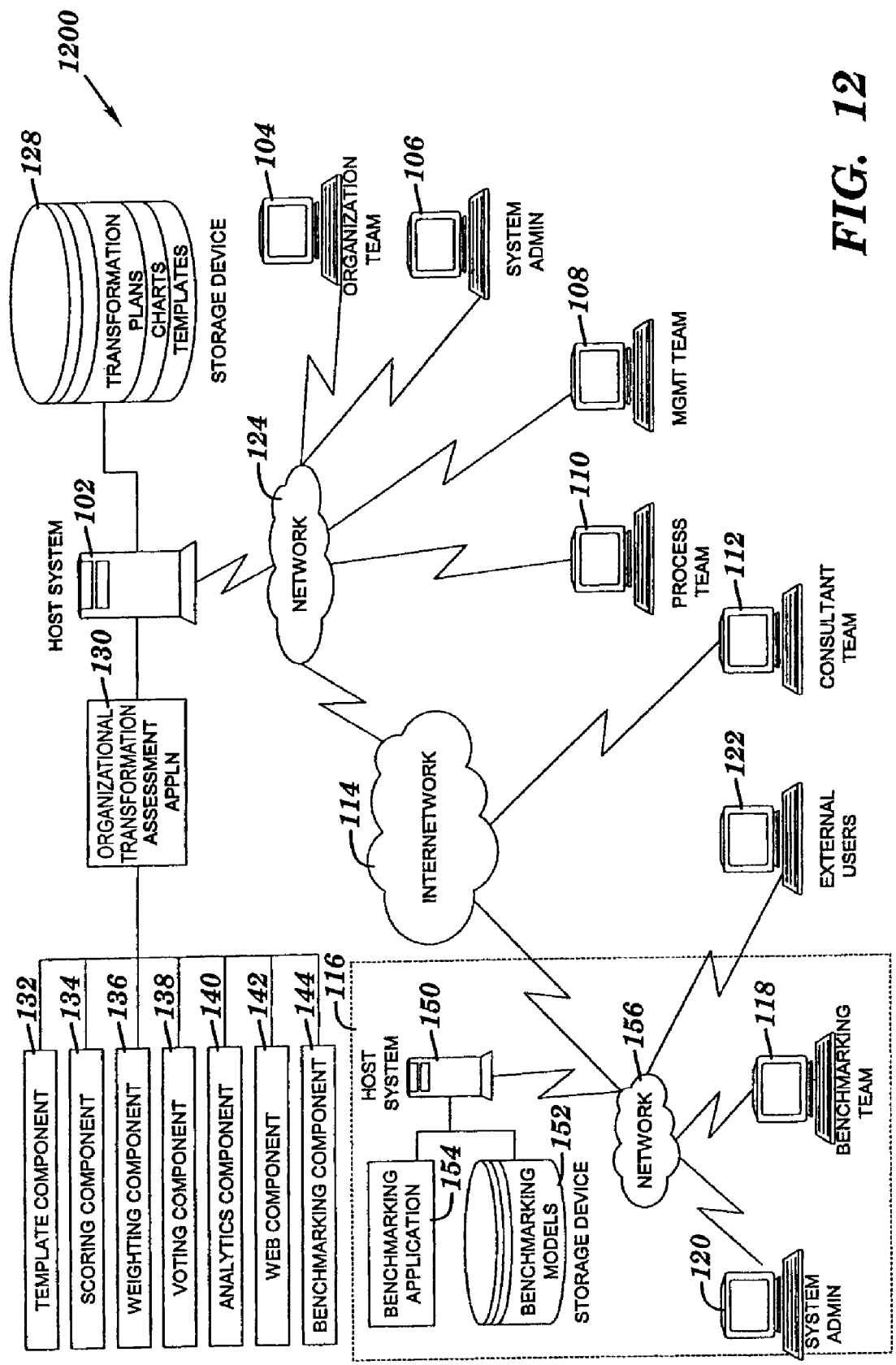
FIG. 12 is a block diagram illustrating the system architecture upon which benchmarking organizational transformation assessment processes may be implemented in an exemplary embodiment.

As described above, there are three modes of implementation for the transformation assessment process: organizational, benchmarking, and a combination of both organizational and benchmarking. The benchmarking mode of implementation is performed in conjunction with a third-party providing confidential and proprietary data from external users (e.g., operators of client system 122). Turning now to FIG. 12, an exemplary system upon which the benchmarking organizational transformation assessment process may be implemented in alternative embodiments will now be described.

The exemplary system 1200 of FIG. 12 includes the same entities as described above in the system 100 of FIG. 1. However, system 1200 further includes a benchmarking entity 116 comprising a host system 150 in communication with client systems 118-122 via one or more networks 156, 114, and 124. The functionality of host system 150 is similar to that described above with respect to host system 102 of FIG. 1, except that the host system 150 is operated by individuals comprising the benchmarking entity 116. Likewise, host system 150 includes a storage device 152 that may be similar in functionality to the storage device 128 described above with respect to system 100 of FIG. 1. However, unlike the host system 102 of FIG. 1, the host system 150 of FIG. 12 executes a benchmarking application 154. Further, storage device 152 differs from storage device 128 in that storage device 152 stores a confidential database of responses to data models provided by external users such as client system 122. Each data model may have unique external user data associated therewith. The benchmarking team of client system 118 may apply various mathematical or logical calculations for aggregating the data.

The organizational transformation assessment process system enables the benchmarking team to provide relative performance scores to their clients' (e.g., external users) organizational transformation assessment application's benchmarking component 144 without revealing confidential information about specific external users. The benchmarking application 154 includes a computer program that implements the third-party benchmarking processes described herein. Due to the breadth of the organizational transformation assessment process system, there may be multiple benchmarking applications utilized for assessments.

Benchmarking team client system 116 refers to a computer or workstation operated by an independent third party whose value proposition includes providing a confidential benchmarking service to its customers. In some cases, the benchmarking team may be all or part of the consultant team of client system 112 when directed by the organization team. The benchmarking team interacts with the organization team's representatives and other external users (other customers). The benchmarking team selects standard management areas, process areas, functional areas, and solutions (usually based upon a decomposed standard process model with associated solutions), maintains a list of its customers, compiles the data provided by its customers, and produces confidential assessment reports. The assessment reports rank customers in relationship to the comparative population, but does not reveal the specific rankings of the other benchmarked companies. The benchmarking team initializes, manages, and maintains the benchmarking application 154.

System administrator client system 120 refers to a computer or workstation operated by a system administrator of the benchmarking teams of client system 118. The system administrator handles the network administrative functions that enable benchmarking team members to communicate with the entities associated with the system 1200 of FIG. 12.

External users client system 122 refers to a computer or workstation operated by customers of the benchmarking entity 116. In most cases, the external users would have teams performing assessments that would be forwarded to the benchmarking application 154.

In exemplary embodiments, benchmarking component 144 is initialized, operated, and maintained by the benchmarking team. The benchmarking team selects standard process model with associated management areas, functional areas, processes and solutions (applications). Benchmarking component 144 calculates averages and totals, and produces confidential assessments (weighted and/or unweighted) based on requests from the enterprise team.

Figure 13A:
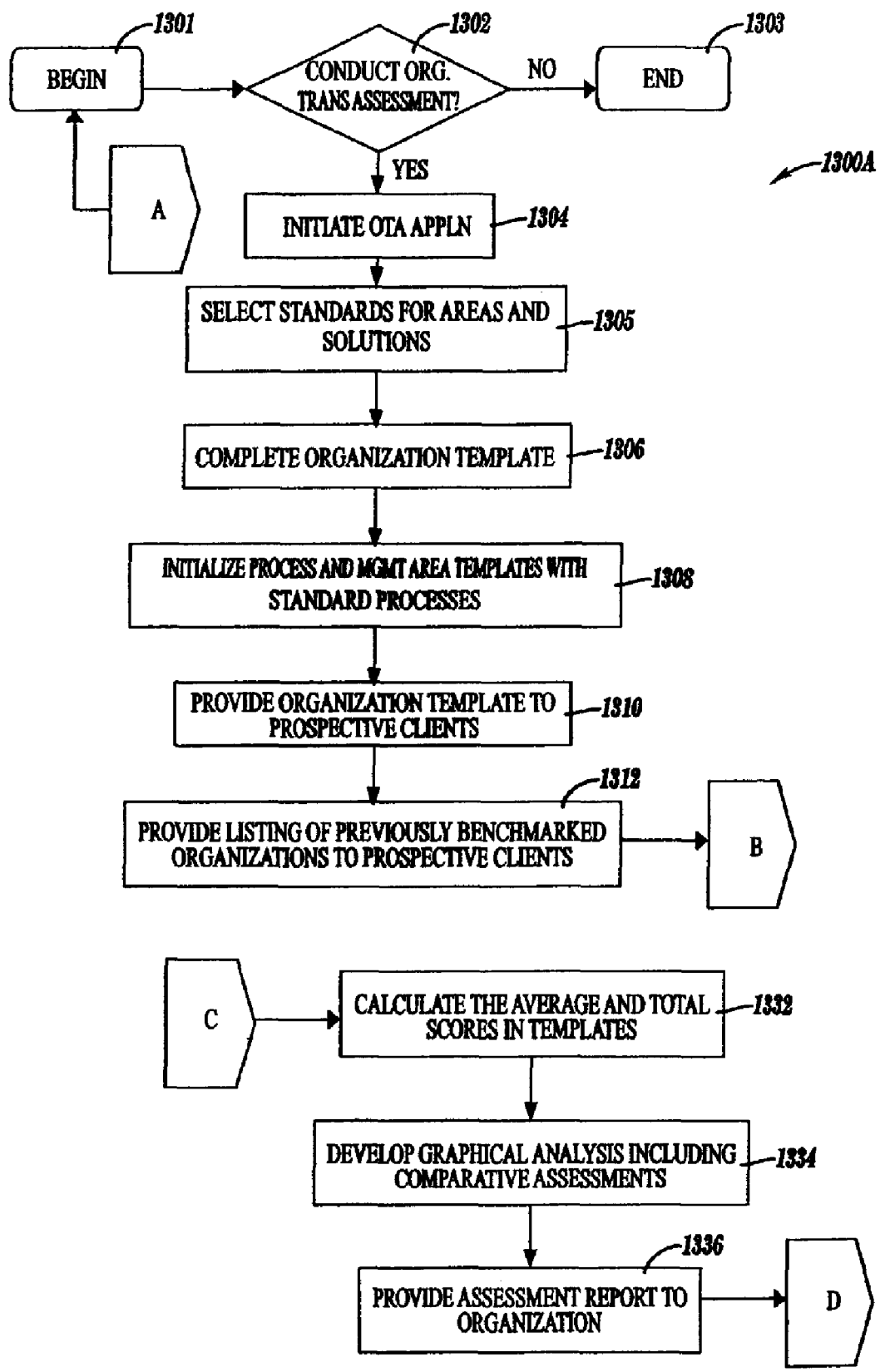
FIGS. 13A-13B are flow diagrams describing the benchmarking organizational transformation assessment process in an exemplary embodiment.
Figure 13B:
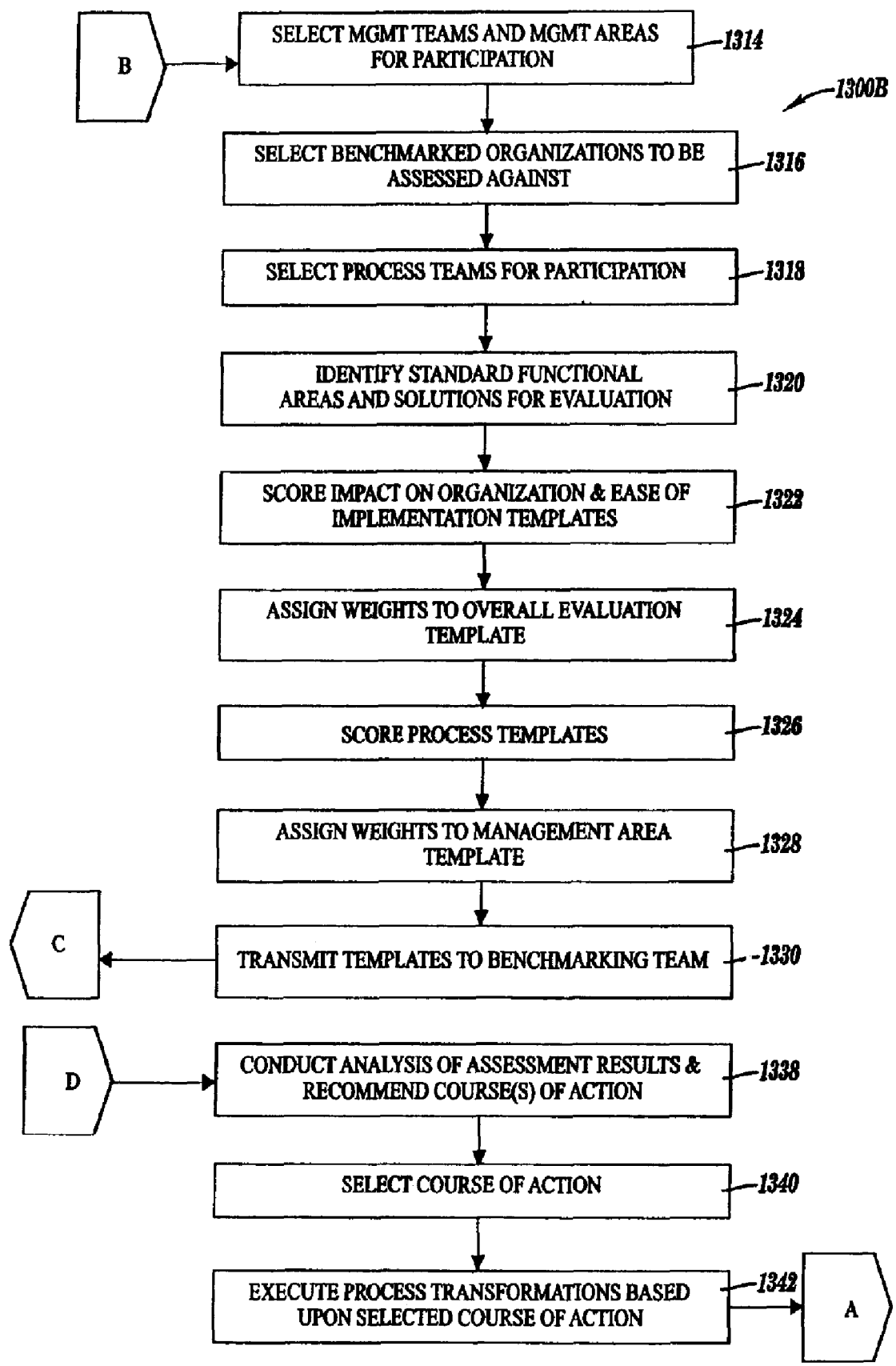

Turning now to FIGS. 13A-13B, a method for implementing the transformation assessment process via the benchmarking mode of operation will now be described.

For purposes of illustration, the functions performed by, or on behalf of, external parties (e.g., benchmarking client system 118, system administrator client system 120, and external users 122) are provided in FIG. 13A and those performed by the organization members (e.g., client systems 104-110) are provided in FIG. 13B for ease of understanding. The method begins at step 1301 whereby the organization determines whether to conduct an organizational transformation assessment at step 1302. If not, the method ends at step 1303. Otherwise, the organizational transformation assessment application 130 is initiated by the benchmarking team via, e.g., web component 142 at step 1304. The benchmarking team identifies and selects standards for management areas, process areas, functional areas and solutions at step 1305. This information may be based upon a decomposed standard process model with associated solutions. Once identified, the benchmarking team accesses Organization template 500 of FIG. 5 and completes the template 500 at step 1306. The benchmarking team, or alternatively the organizational transformation assessment application 130, initializes the Process templates 700A-B of FIG. 7 and the Management Area template 800 of FIG. 8 with these standard processes at step 1308. Upon completion, the benchmarking team provides the Organization template 500 to prospective clients (e.g., external user system 122) at step 1310. The benchmarking team then provides a listing of previously benchmarked organizations to prospective clients at step 1312 and the method proceeds to step 1314 of FIG. 13B.

The organization team (e.g., the entity receiving the Organization template 500) selects one or more management teams and management areas for participation in the assessment at step 1314. The organization team and management team then select the desired benchmarked organizations against which they will be assessed at step 1316. This selection may come from the listing of previously benchmarked organizations. At step 1318, the management team selects process teams for participation in the assessment. Further, the management team and selected process teams identify standard (e.g., industry standard) functional areas for evaluation at step 1320. This selection may originate from the Organization template 500 which includes the information supplied at steps 1304 and 1306 of FIG. 13A.

The management team then provides scoring data via the Impact on Organization and Ease of Implementation templates 600 of FIG. 6 and 900 of FIG. 9, respectively at step 1322. At step 1324, the management team assigns weights to the Overall Evaluation template 1000 of FIG. 10. The process team(s) completes the Process template 700A-B with scoring data at step 1326 and also assigns weights to the Management Area template 800 of FIG. 8 at step 1328. The templates completed above are then presented to the benchmarking team at step 1330 and the method continues at step 1332 of FIG. 13A.

The benchmarking team receives the templates and calculates the averages and total scores in the templates at step 1332. The benchmarking team then generates a graphical analysis (including comparative assessments) via the analytics component 140 of FIG. 12 at step 1334. The graphical analysis and related reports are then provided to the subject organization at step 1336 and the method returns to FIG. 13B.

Upon receiving the results, the management team conducts an analysis of the assessment information and recommends one or more courses of action to the organization team at step 1338. The organization team reviews the recommendations and selects a course of action at step 1340. The management and process teams then execute a transformation process based upon the selected course of action at step 1342.

If desired, the assessment process may be repeated whereby the method returns to FIG. 13A at step 1301.

As indicated above, the organizational transformation assessment process system provides the ability to evaluate, compare, and prioritize transformation. The organizational transformation assessment process system is an interdisciplinary, proactive process that evaluates one or more functional areas within an organization. Each functional area, and its proposed solutions for organizational transformation, is assessed on several defined and rank-ordered considerations. The method assesses each functional area's impact on the organization, conducts process gap analyses, and compares the ease of implementation of potential solutions.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for assessing and implementing an organizational transformation, the organizational transformation process operating on a host system computer of an organization over a communication network, the method comprising:

identifying, via an application executing on the host system computer at least one process area for each management area targeted for assessment;

receiving, via the application, at least one solution for the at least one process area, wherein a pairing of a solution to a process area represents a functional area;

determining, via the application, a need for organizational transformation at a functional area level of the functional area, comprising:

ranking each of the functional areas according to a perceived need for the organizational transformation, the ranking comprising:

receiving, from client system computers in communication with the host system, values each of which represents a perceived level of impact that facets of the functional area have on the organization; and calculating, via the application executing on the host system computer, an overall score from the values by averaging the values for each of the client system computers and applying weights to averaged valued based upon a management level attributed to each user of the client system computers;

wherein upon agreement of the overall score by the users, the overall score is applied as a ranking value to the functional area, wherein a highest ranking value represents a greatest level of impact on the organization; and wherein upon disagreement of the overall score by the users, providing a voting component to each of the client system computers via the application, the method further comprising applying proposed weighting values received from the users via the voting component to facets of the functional area and averaging the proposed weighting values to derive a new overall score;

evaluating, via the application, each of the at least one process area against each of the at least one corresponding solution and calculating any remaining performance gaps identified based upon the evaluating;

evaluating, via the application, an implementation capability for each of the at least one solution;

determining a need for performing an organizational transformation with respect to at least one of the functional areas, the need based upon the overall score and results of evaluating a corresponding implementation solution; and outputting, via the application, results of each of the assessments to at least one of the client system computers.

2. The method of claim 1, wherein the voting component implements ranking by secret ballot.

3. The method of claim 1, wherein the step of performing assessments further includes assessing functional areas based upon categories, the categories including:
   metrics including a measurement of a process or activity;
   required functionality including a designed use of a process or activity that creates value;
   data including historical, referential, statistical, and data derived by calculation, the data organized for analysis or used as a basis for a decision; and
   rules including regulations governing a process or activity.

4. The method of claim 1, wherein the implementation capability is measured in terms of at least one of:
   readiness;
   riskiness;
   implementation duration and complexity;
   fit with organizational strategy; and
   cost.

5. The method of claim 1, wherein the implementation duration is associated with at least one of:
   strategic transformation; and
   tactical transformation.

6. The method of claim 1, wherein the assessments are performed in conjunction with a benchmarking system.

7. The method of claim 1, wherein the management area includes at least one of:
   marketing;
   procurement;
   finance;
   manufacturing; and
   channel management; and
wherein the at least one process area includes at least one of:
   scheduling;
   customer fulfillment;
   integrated marketing communications;
   inventory control;
   intra-company accounting; and
   reverse logistics.

8. The method of claim 1, wherein the organization includes at least one of:
   a business entity;
   government;
   military;
   non-profit organization;
   educational institution; and
   research institution.

9. A system for assessing and implementing an organizational transformation, comprising:
   a host system computer; and
   an application executing on the host system computer, the application performing:
   identifying at least one process area for each management area targeted for assessment, each management area being associated with an organization;
   receiving at least one solution for the at least one process area, wherein a pairing of a solution to a process area represents a functional area;
   determining a need for organizational transformation at a functional area level of the functional area, comprising:
   ranking each of the functional areas according to a perceived need for the organizational transformation, the ranking comprising;
      receiving, from client system computers in communication with the host system, values each of which represents a perceived level of impact that facets of the functional area have on the organization; and
      calculating an overall score from the values by averaging the values for each of the client system computers and applying weights to averaged valued based upon a management level attributed to each user of the client system computers;
   wherein upon agreement of the overall score by the users, the overall score is applied as a ranking value to the functional area, wherein a highest ranking value represents a greatest level of impact on the organization; and
   wherein upon disagreement of the overall score by the users, providing a voting component to each of the client system computers via the application, the method further comprising applying proposed weighting values received from the users via the voting component to facets of the functional area and averaging the proposed weighting values to derive a new overall score;
   evaluating each of the at least one process area against each of the at least one corresponding solution and calculating any remaining performance gaps identified based upon the evaluating; and
   evaluating an implementation capability for each of the at least one solution using a set of criteria, the set of criteria including:
      readiness of the organization to implement the solution;
      risk involved in implementing the solution;
      complexity of implementing the solution;
      fit of the solution with an organization strategy;
      resource cost of implementing the solution; and
      duration of implementing of the solution; and
   outputting results of each of the assessments to at least one client system computer in communication with the host system computer.

10. The system of claim 9, wherein the performing assessments further includes performing sensitivity analysis, the sensitivity analysis based upon voting and weighting.

11. The system of claim 9, wherein the performing assessments further includes assessing functional areas based upon categories, the categories including:
- metrics including a measurement of a process or activity;
- required functionality including a designed use of a process or activity that creates value;
- data including historical, referential, statistical, and data derived by calculation, the data organized for analysis or used as a basis for a decision; and
- rules including regulations governing a process or activity.

12. The system of claim 10, wherein the voting and weighting are scaled based on a voter's management level within the organization.

13. The system of claim 9, wherein the implementation duration is associated with at least one of:
- strategic transformation; and
- tactical transformation.

14. The system of claim 9, further comprising a link to a benchmarking computer system, wherein the assessments are performed in conjunction with the benchmarking computer system.

15. The system of claim 9, wherein the management area includes at least one of:
- marketing;
- procurement;
- finance;
- manufacturing; and
- channel management.

16. The system of claim 9, wherein the at least one process area includes at least one of:
- scheduling;
- customer fulfillment;
- integrated marketing communications;
- inventory control;
- intra-company accounting; and
- reverse logistics.

17. The system of claim 9, wherein the organization includes at least one of:
- a business entity;
- government;
- military;
- non-profit organization;
- educational institution; and
- research institution.

18. A computer-executable program product comprising computer executable instructions tangibly embodied on a computer readable medium that when executed by said computer perform the method steps comprising:
- identifying at least one process area for each management area targeted for assessment;
- receiving at least one solution for the at least one process area, wherein a pairing of a solution to a process area represents a functional area;
- determining a need for organizational transformation at a functional area level of the functional area, comprising:
- ranking each of the functional areas according to a perceived need for the organizational transformation, the ranking comprising:
- receiving from client system computers in communication with the processor, values each of which represents a perceived level of impact that facets of the functional area have on the organization; and
- calculating an overall score from the values by averaging the values for each of the client system computers and applying weights to averaged valued based upon a management level attributed to each user of the client system computers;
- wherein upon agreement of the overall score by the users, the overall score is applied as a ranking value to the functional area, wherein a highest ranking value represents a greatest level of impact on the organization; and
- wherein upon disagreement of the overall score by the users, providing a voting component to each of the client system computers via the application, the method further comprising applying proposed weighting values received from the users via the voting component to facets of the functional area and averaging the proposed weighting values to derive a new overall score;
- evaluating each of the at least one process area against each of the at least one corresponding solution and calculating any remaining performance gaps identified based upon the evaluating;
- evaluating an implementation capability for each of the at least one solution;
- determining a need for performing an organizational transformation with respect to at least one of the functional areas, the need based upon the overall score and results of evaluating a corresponding implementation solution; and
- outputting results of each of the assessments to at least one of the client system computers.

19. The storage medium of claim 18, wherein the performing assessments further includes assessing functional areas based upon categories, the categories including:
- metrics including a measurement of a process or activity;
- required functionality including a designed use of a process or activity that creates value;
- data including historical, referential, statistical, and data derived by calculation, the data organized for analysis or used as a basis for an decision; and rules including regulations governing a process or activity.

* * * * *